United States Patent [19]

Kerr

[11] Patent Number: 4,675,839

[45] Date of Patent: Jun. 23, 1987

[54] RECEIVER FOR A SPREAD SPECTRUM COMMUNICATION SYSTEM HAVING A TIME-MULTIPLEXED CONVOLVER

[75] Inventor: Leo A. Kerr, Woodstock, Md.

[73] Assignee: Allied Corporation, Morristown, N.J.

[21] Appl. No.: 721,610

[22] Filed: Apr. 10, 1985

[51] Int. Cl.$^4$ ............................................ G06G 7/195
[52] U.S. Cl. ................................... 364/821; 364/861;
333/150; 333/154
[58] Field of Search .................. 364/807, 819–821,
364/861, 604; 310/313 R, 313 A, 313 B, 313 C,
313 D; 333/150, 152–154, 157, 195

[56] References Cited

U.S. PATENT DOCUMENTS

| | | | |
|---|---|---|---|
| 4,224,683 | 9/1980 | Adkins | 364/821 |
| 4,388,599 | 6/1983 | Gautier et al. | 333/150 |
| 4,428,062 | 1/1984 | Michaels | 364/821 |
| 4,448,805 | 5/1984 | Lewis | 310/313 R X |
| 4,473,888 | 9/1984 | Smith | 364/821 |
| 4,592,009 | 5/1986 | Masheff | 364/821 |

Primary Examiner—Gary V. Harkcom
Attorney, Agent, or Firm—Jas. R. Ignatowski; Robert M. Trepp

[57] ABSTRACT

A convolver having at least a first interdigital transducer for generating a first surface acoustic wave in response to an input signal and a second interdigital transducer for generating a second surface acoustic wave counter to the first surface acoustic wave in response to a time reversed-time multiplexed reference signal. A segmented summing bus having a plurality of fingers extending into the interaction region of the first and second surface acoustic waves generates a plurality of samples indicative of the convolution of the first and second surface acoustic waves. The convolver also includes a pair of acoustic horns, one disposed between the segmented summing bus and each of the interdigital transducers and a ground bus having a plurality of filler segments extending intermediate the fingers of the segmented summing bus.

38 Claims, 11 Drawing Figures

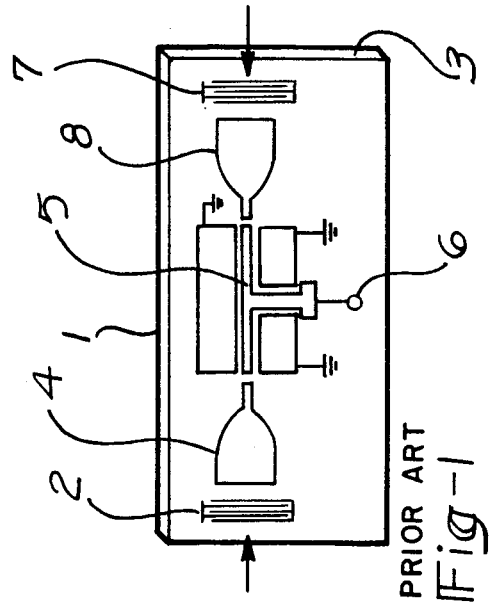
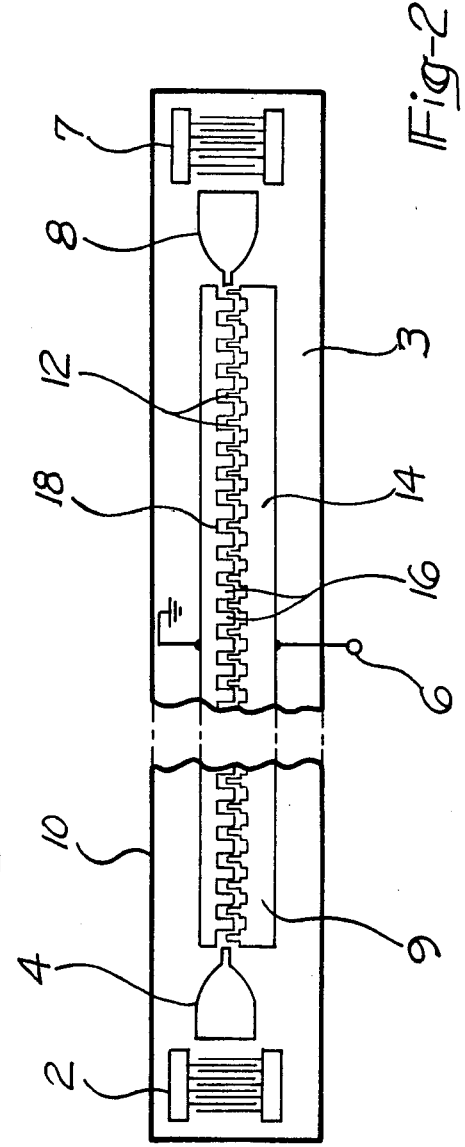

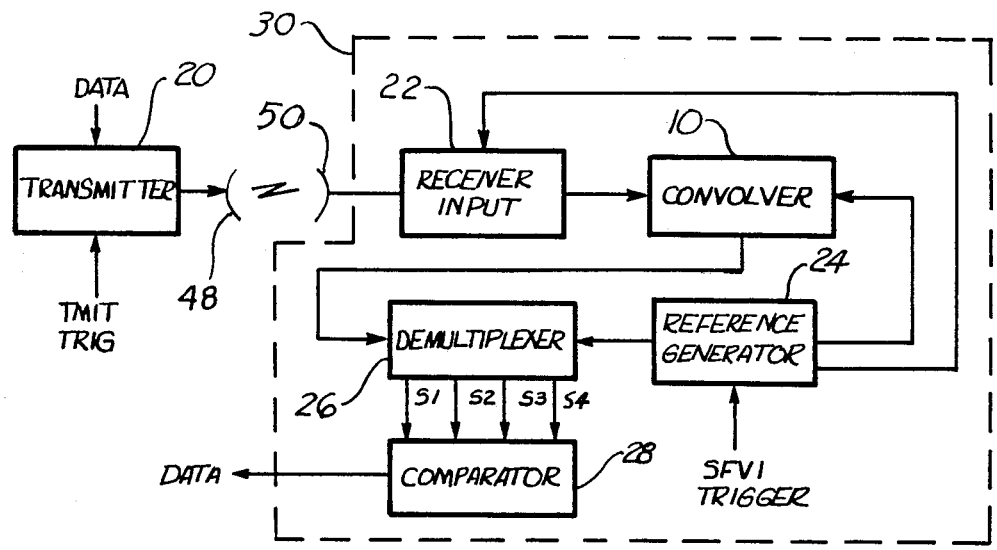
Fig-5
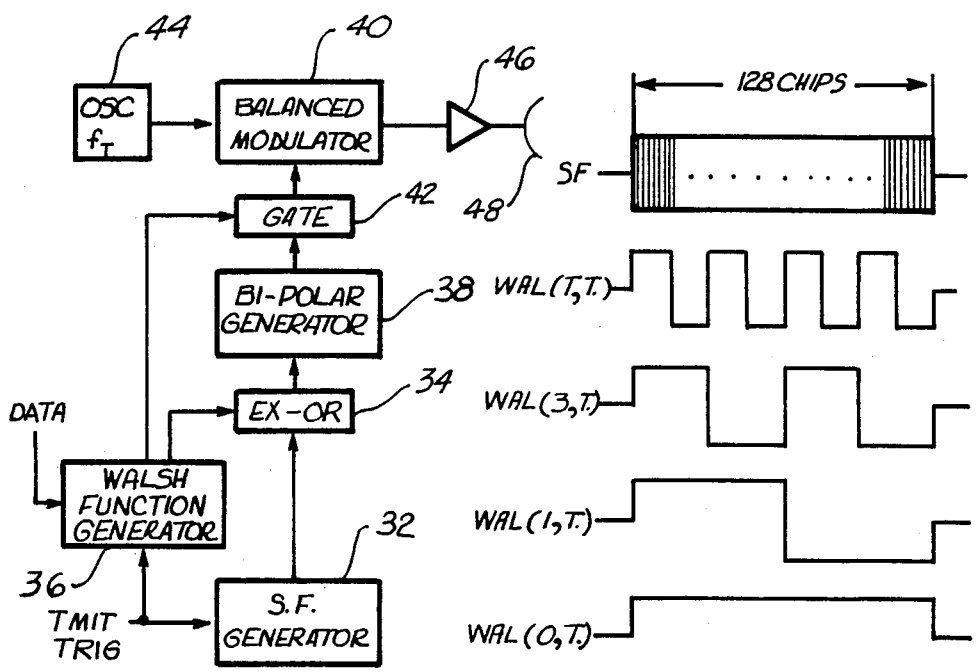
Fig-6
Fig-7

RECEIVER FOR A SPREAD SPECTRUM COMMUNICATION SYSTEM HAVING A TIME-MULTIPLEXED CONVOLVER

BACKGROUND OF THE INVENTION

1. Field of the Invention

The invention is related to surface acoustic wave convolvers and in particular to a time multiplexed convolver for M-ARY orthogonal keyed decoding.

2. Prior Art

M-ary Orthogonal Keying data modulation is a technique used in spread spectrum communications where one basic spreading function (SF) such as a pseudo random noise (PN) sequence is phase modulated on a carrier. The basic spreading function is modulated by certain other functions, such as Walsh functions, to cause a modulation orthogonal to the basic spreading function and every other function used. The resultant response of a signal in a channel, match filtered to an orthogonally modulated signal, is zero while the matched response is a maximum.

This modulation technique is used extensively in secure communications, both for continuous communications and short message formats. Spreading the small amount of information pseudo randomly over a wide bandwidth allows for a low probability of intercept since the signal power density can be below the noise power density. Only by knowing the spreading function can the signal energy be integrated above the noise.

Conventionally, orthogonal-keyed data is recovered by implementing parallel decoding devices such as correlators or convolvers and then comparing the filtered amplitudes as in a Mark and Space receiver. This is sometimes implemented by parallel processing the orthogonal modulations using partial sums from a single decoder of the basic pseudo-random noise (PN) spreading function. Convolvers are generally used for maximum bandwidth modulation where the spreading function is changing after short intervals. However, convolvers are capable of much wider bandwidths than can be obtained in base band processing. Therefore, convolvers have a lot of excess bandwidth over that required for modulation.

This invention takes advantage of the excess bandwidth of the convolver by time multiplexing more than one reference signal and applying the time multiplexed reference signal to the signal via the reference input of the convolver. To prevent the summing bus of the convolver from simultaneously containing the product of the input signal with all of the time multiplexed reference signals, the resultant signal from the input signal and one of the time multiplexed reference signals is kept separated from the other resultant signals by segmenting the summing bus of the convolver.

SUMMARY OF THE INVENTION

The invention is a time multiplexed convolver for convolving an input signal with a time reversed-time multiplexed reference signal. The convolver has a first interdigital transducer disposed on a piezoelectric substrate for launching a first surface acoustic wave along a first path in response to the input signal, a second interdigital transducer disposed on the substrate, displaced from said first interdigital transducer along said first path for launching a second surface acoustic wave towards said first interdigital transducer in response to time reversed-time multiplexed reference signal, said first path defining an interaction region between said first and second surface acoustic waves, and a segmented summing bus disposed on said substrate between said first and second interdigital transducers for generating time multiplexed samples from the convolution of said first and second surface acoustic waves, said segmented summing bus having a plurality of equally spaced fingers extending into said interaction region and a connector bus connected to said plurality of fingers outside said interaction region. In the preferred embodiment the convolver has a pair of acoustic horns, one disposed intermediate said segmented summing bus and each of the interdigital transducers and a ground bus having a plurality of segments extending into the interaction region intermediate said fingers.

The advantage of the time multiplexed convolver is that it replaces a plurality of convolvers. Another advantage is that it eliminates parallel decoding systems minimizing weight and power consumption. These and other advantages will become more apparent from reading the detailed description of the invention in conjunction with the drawings.

BRIEF DESCRIPTION OF THE DRAWINGS

FIG. 1 is a drawing illustrating the details of a conventional surface acoustic wave convolver.

FIG. 2 is a drawing illustrating the details of the time-multiplexed convolver.

FIG. 5 is a block diagram showing the details of the spread function communication system.

FIG. 6 is a block diagram of the transmitter.

FIG. 7 illustrates the waveforms of the spreading function and Walsh functions used to describe the operation of the communication system.

DETAILED DESCRIPTION OF THE INVENTION

Conventional Convolver

Figure 3:
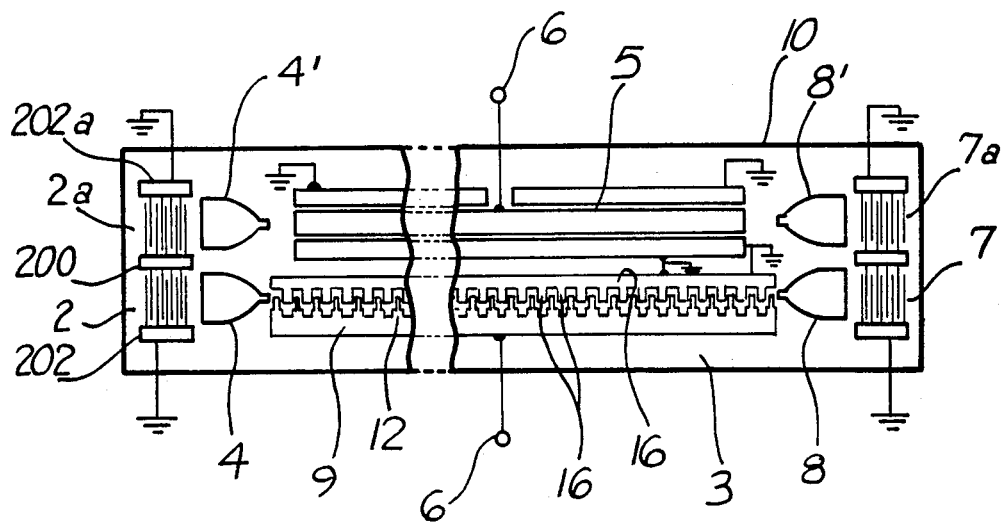
FIG. 3 is a drawing illustrating the details of a first alternate embodiment of the time multiplexed convolver.

Shown in FIG. 1 is a conventional broadband width surface acoustic wave convolver 1 such as disclosed by Michaels in U.S. Pat. No. 4,428,062. A pseudo-random noise, phase modulated input surface acoustic wave is launched by an interdigital transducer 2 onto a piezoelectric substrate 3, such as a lithium niobate substrate. The launched surface acoustic wave is compressed and focused by an acoustic horn 4 along a path covered by a summing metal strip 5 having an output terminal 6. This compression increases the energy density of the acoustic wave thereby enhancing the non-linear interactions in the region of summing strip 5.

A reference surface acoustic wave, identical in form with the input acoustic wave, but time reversed is launched by interdigital transducer 7 onto the substrate 3 and focused by acoustic horn 8 along the path covered by the summing strip 5. The reference surface acoustic wave propagates in a direction opposite from the input acoustic wave. The distortion of the substrate along counter propagating paths of the input and reference acoustic waves produces a fluctuating voltage, due to the piezoelectric properties of the substrate, which is the sum of the energy of the two acoustic waves at each point along the path. These voltages are picked up and summed by the summing strip 5 to produce a waveform at output terminal 6 which is proportional to the convolution of the two surface acoustic waves, except that the produced waveform is compressed 2 to 1 in time. The launching of the reference acoustic wave at a 2 to 1 duty cycle causes a convolution of the input signal at the output terminal 6 continuous with time. The waveform at the output terminal 6 is compressed 2 to 1 and the desired portion of the waveform has a 50% duty cycle, the other 50% is discarded.

If, for example, the input signal has one of four different orthogonal phase modulated sequences, such as a 4-ary-OK (orthogonally keyed) modulation, four convolvers such as shown in FIG. 1 using different reference signals would have to be used in parallel. The four outputs are then compared to determine which one produces the largest signal at its output terminal at the compressed peak time.

Time Multiplexed Reference Convolver

In order to reduce the size, weight, and power consumption, a single time-multiplexed convolver 10 of the type shown on FIG. 2 may be used in place of multiple convolvers of the type shown in FIG. 1. The advantage of the convolver of FIG. 2 is that it is capable of time multiplexing the multiple reference signals by sampling each reference signal at the chip rate for a predetermined fraction of a chip width.

The samples are staggered in time for each time-multiplexed reference signal. To prevent sampling loss, the samples may be taken at the optimum phase of the reference waveform and the time difference between the optimum phase of the modulated input signal and the time-multiplexed position of the reference signal may be compensated before amplitude comparison.

To prevent the summing bus output from being a function of the multiplexed reference signals, a segmented summing bus 9 as shown on FIG. 2 is used. The convolver of FIG. 2 is similar to that shown on FIG. 1 having first and second interdigital transducers 2 and 7, acoustic horns 4 and 8 disposed on a piezoelectric substrate 3, except that in the interaction area of the two signals, the summing bus 9 is segmented having a plurality of summing fingers 12 selecting the product of the input signal and the samples of the desired reference signal. The fingers 12 have a width corresponding to $\frac{1}{2}$M of the chip width of the surface acoustic wave in the substrate 3 where M is equal to the number of orthogonal phase modulations of the reference signal. For example, for a 4-ary OK orthogonal phase modulated reference signal, the width of the fingers would be one eighth of the chip width. The fingers 12 are spaced at chip-width intervals for sampling once per each chip. The fingers 12 are connected to a connector bus 14 disposed outside of the surface acoustic beam interaction region so that the signal induced in the fingers 12 is a sample of the input signal at one point in the convolution with one of the multiplexed reference signals. The next sample of the input signal is the signal induced in the fingers at another point in the convolution with another of the multiplexed reference signals. For example, with a 4-ary OK modulated input signal, there would be four time-multiplexed reference signals and four samples would be extracted, one corresponding to each of the four reference signals.

In order to prevent the fingers 12 from distorting the surface acoustic wave beam in the interaction area, filler segments 16 are disposed between the fingers 12, as shown, to give continuity to the wave guide like medium. Each of these filler segments 16 is connected to a grounded bus 18 outside of the interactive region of the beams.

Figure 4:
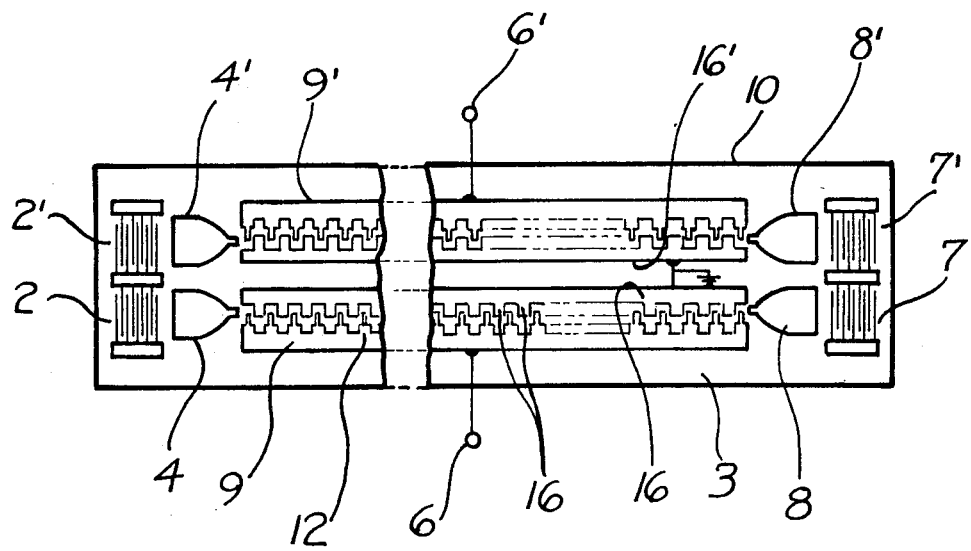
FIG. 4 is a drawing illustrating the details of a second alternate embodiment of the time multiplexed convolver.

In order to reduce spurious noise signals in the time multiplexed convolver, a second parallel convolver may be formed in parallel with the time multiplexed convolver shown on FIG. 2. The second convolver has a third interdigital transducer launching a third surface acoustic wave 180° out of phase with the first surface acoustic wave launched by the first interdigital transducer of the time-multiplexed convolver. The second convolver may be of the type disclosed by Michaels as illustrated in FIG. 3 or may be a second time-multiplexed convolver as shown in FIG. 4. Referring first to FIG. 3, the first (lower) convolver is identical to that shown on FIG. 2 while the second (top) convolver is a conventional convolver of the type shown in FIG. 1. In this embodiment, the two first digital transducers 2 and 2a have a common terminal 200 receiving the input signal and the other two terminals 202 and 202a are grounded as shown. For simplicity, the identification numerals are identical with the numerals used with reference to FIGS. 1 and 2 except the elements of the second convolver are followed by the letter "a". As known in the art, the input signal may alternatively be applied to terminals 200 and 200a and the common terminal 200 grounded. The connections of the interdigital fingers of transducers 2a of the conventional convolver are reversed with respect to the terminal 200 so that the surface acoustic wave launched in response to the input signal is 180° out of phase with the surface acoustic wave launched by transducer 2 of the time-multiplexed convolver. The length of the summing strip 5 of the conventional convolver is adjusted so that the surface acoustic waves launched by the first and third transducers 2 and 2a, respectively, are received by the second and fourth interdigital transducers 7 and 7a, respectively, remain 180° out of phase.

The fingers of the second and fourth interdigital transducers 7 and 7a are connected identically between the terminals 204, 206 and 206a so that the surface acoustic waves launched by the second and fourth interdigital transducers 7 and 7a are in phase. With this arrangement the surface acoustic waves generated by the first and third interdigital transducers 2 and 2a are received by the second and fourth transducers 7 and 7a, and vice versa, are out of phase and cancel each other substantially reducing the generation of spurious signals in the convolver. In a like manner, the surface acoustic waves launched by the second interdigital transducers 7 and 7a are received out of phase by the first and third interdigital transducers 2 and 2a also reducing the generation of spurious signals by the first transducers in response to the received surface acoustic waves. The multiplex output samples of the convolvar are generated at the output terminal 6 of the first convolver as previously discussed.

Alternatively as shown in FIG. 4, the convolver may comprise two time-multiplexed convolvers of the type shown on FIG. 2. As in the embodiment shown on Figure 3, the fingers of the first and third interdigital transducers 2 and 2b are connected to terminal 200 displaced by 180° so that the launched surface acoustic waves are 180° out of phase to reduce the generation of spurious signals as discussed relative to the embodiment shown on FIG. 3. The time-multiplexed output of the convolver of FIG. 4 may be taken from the terminals 6 or 6b as desired or they may be added together by using an appropriate phase delay circuit (not shown) which will delay the phase of one or the other of the two output samples, placing the output samples of both convolvers back in phase. As is known, the connection of the fingers on the first and third interdigital transducers 2 and 2a may be identical and the connection of the fingers of second and fourth interdigital transducers 7 and 7a reversed to produce the same effect.

System Implementation

FIG. 5 is a block diagram of a spread spectrum communication system embodying the time-multiplexed reference convolver of the type shown on FIGS. 2, 3 or 4. A Transmitter 20, for example, generates and transmits a 128 chip long binary phase shift keyed (BPSK) modulated signal with a pseudo-random noise spreading function. The transmitted signal has a M-ary orthogonally keyed data modulation superimposed on the chosen spreading function (SF). For example, the M-ary orthogonally keyed data modulation is a 4-ary orthogonally keyed (4-OK) data modulation in which the modulating waveforms are four Walsh functions such as Walsh function WAL (0,T), WAL (1,T), WAL (3,T), and WAL (7,T) shown on FIG. 7.

The 128 chip long phase shifted keyed modulated transmitted signal is received by a Receiver 30 and is converted to a convenient intermediate (IF) frequency in a Receiver Input 22. This intermediate frequency signal is applied to the input of the time-multiplexed Convolver 10 of the type shown on FIGS. 2, 3 or 4. A Reference Signal Generator 24 generates the required time-multiplexed reference signals which are applied to the opposite end of Convolver 10. The reference signals are reversed in time and have the same frequency as the intermediate frequency of the signal input to the Convolver 10 from the Receiver Input 22.

The convolution of the four time-multiplexed reference signals with the signal received from Receiver Input 22 in Convolver 10 produces four time-multiplexed output sampled signals. The four output sampled signals are separated into four separate channels in Demultiplexer 26 where the output samples $s_1$ through $s_4$ are gated and filtered. The data is finally recovered by comparing the relative amplitudes of the four channels in Comparator 28.

A detailed block diagram of the Transmitter 20 is shown on FIG. 6. Referring to FIG. 6, a Spread Function (SF) Generator 32 serially generates a pseudo-random noise spreading function code, 128 chips long, in response to a transmit (TMIT) trigger signal as shown by waveform SF on FIG. 7. The pseudo-random noise spreading function is also known by the Receiver 30. The spreading function is modulated in the Exclusive OR gate 34 by the Walsh Function sequence generated in the Walsh Function Generator 36 to generate a 4-ary orthogonally keyed data modulated signal superimposed on the chosen 128 chip spreading function signal. The Walsh Function sequence is generated by Walsh Function Generator 36 in response to the transmit trigger signal and mofulated by the data to be transmitted. The modulated unipolar output of Exclusive OR 34 is converted to a bi-polar signal by BI-polar Generator 38 and transmitted to a Balanced Modulator 40 through Gate 42. The gate 42 is enabled by Walsh Function WAL (0,T), shown in FIG. 7, generated by Walsh Function Generator 36.

An Oscillator 44 generates a carrier frequency ($f_T$) signal which is modulated by the bi-polar Ex-Or'ed Walsh Function modulated spreading function signal received from the Bi-Polar Generator 38 to produce a carrier signal modulated with a 128 chip long binary phase shift keyed (BPSK) signal. The modulated carrier signal generated by the Balanced Modulator 40 is amplified by Amplifier 46 and transmitted to the Receiver 30 by antenna 48.

Figure 8:
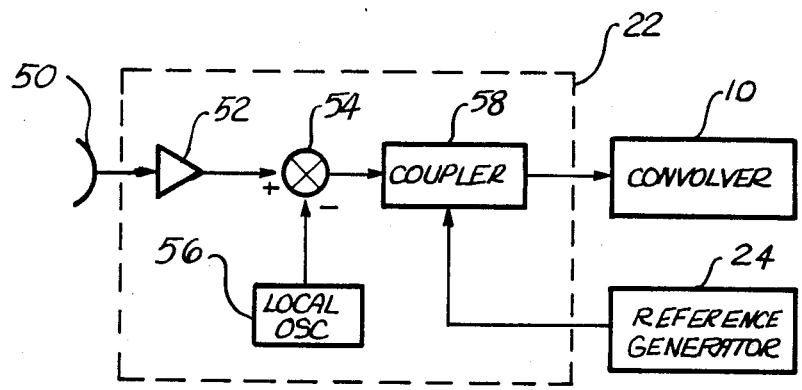
FIG. 8 is a circuit diagram of the receiver input.

The details of the Receiver Input 22 are shown in the block diagram illustrated in FIG. 8. Referring to FIG. 8, an antenna 50 receives the transmitted signal. This signal is amplified in a Preamplifier 52 and combined in Mixer Amplifier 54 with a signal from a Local Oscillator 56 to generate an intermediate frequency signal. A Coupler 58 couples either the intermediate frequency signal generated by Mixer Amplifier 54 or a test signal generated by the Reference Generator 24 to a time-multiplexed Convolver 10, of the type shown on FIGS. 2, 3 or 4.

Figure 9:
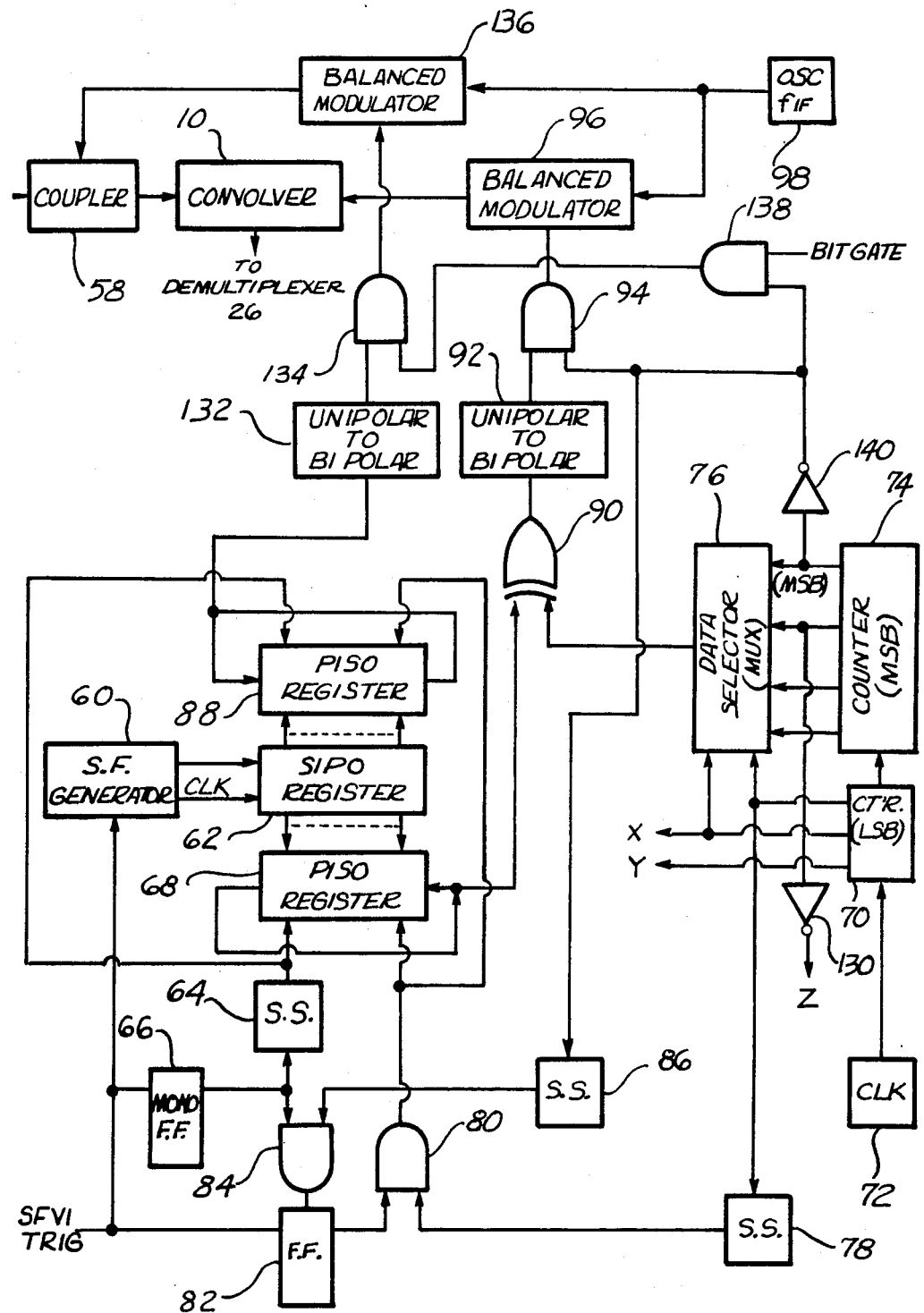
FIG. 9 is a circuit diagram of the Reference Signal Generator Means.

The details of the Reference Generator 24 are shown in the block diagram of FIG. 9. Referring to FIG. 9, the same pseudo random noise spreading function (SF) code used in the Transmitter 20 is generated in a Spreading Function Generator 60 and is initiated by an internally generated spreading function validity internal (SFVI) trigger signal. The 128 chip spreading function code is clocked into a Serial-In-Parallel-Out (SIPO) Shift Register 62. A trigger signal generated by a Single Shot (SS) Multivibrator 64 delayed by the proper time from the SFVI trigger signal by a Monostable Multivibrator 66 is used to transfer the spreading function code in parallel from the SIPO Register 62 to a Parallel-In-Serial-Out (PISO) Shift Register 68 which permits the spreading function code to be extracted in a time reversed order.

Clock pulses having a frequency eight times the chip rate of the transmitted signal are received by a $2^7$ Counter 70 from a Clock 72. The overflow of the $2^7$ Counter 70 is received by a $2^4$ Counter 74. The clock pulses generated at eight times the chip rate causes the most significant bit of Counter 74 to have a half period equal to 128 chips which is the desired symbol length as shown by waveform WAL (0,T) of FIG. 7. The next 3 most significant bits of Counter 74 produce the waveforms WAL (1,T), WAL (3,T), WAL (7,T), respectively. The opposite polarity waveform available in Counter 74 has the same effect as time reversing these waveforms. These are the four time reversed Walsh Functions required for the four reference signals.

In actual practice, time reversing of the Walsh functions is not necessary since the net effect is simply to change the polarity of the modulated signal, and this processing is independent of the relative phase between the input signal and the reference signal. The time reversing of the Walsh function, described herein, is used to simplify the understanding of the process.

The Data Selector 76 is controlled by the second and third lease significant bits of Counter 70 which causes each of the four outputs of Counter 74 to be sampled once during each chip width. The output of Data Selector 76 are segments of the four Walsh functions in a sequential order during each chip width as shown in FIG. 11 as waveforms RWAL (0,T,) RWAL (1,T), RWAL (3,T), and RWAL (7,T) and the time-multiplexed waveform (TMWF).

Figure 11:
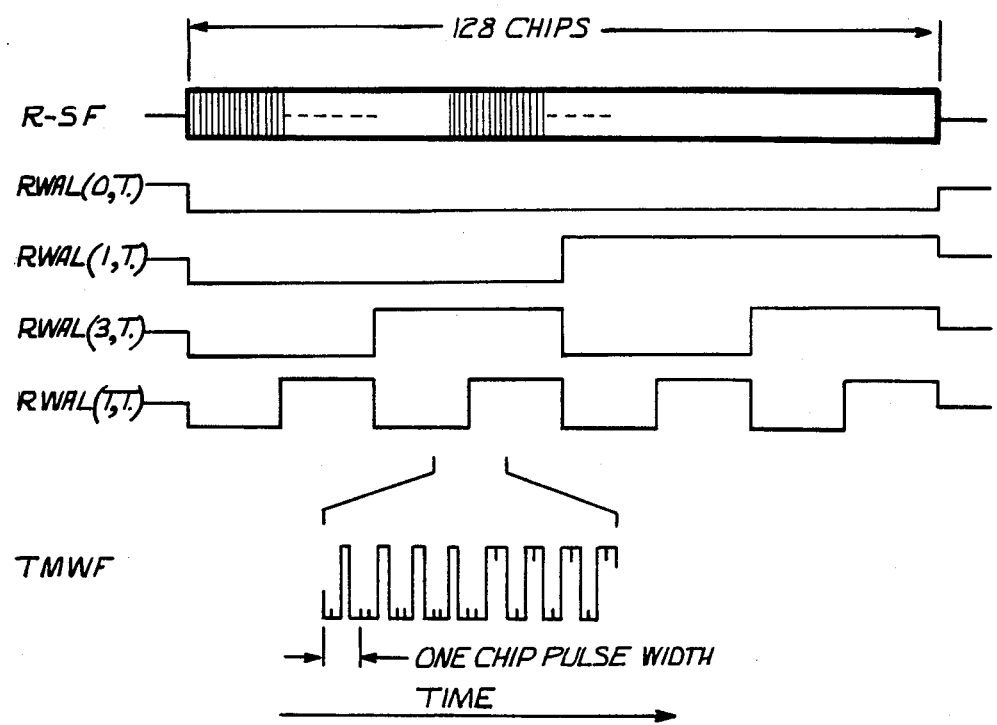
FIG. 11 illustrates the waveforms generated by the Reference Signal Generator Means.

Referring now to FIG. 11, the waveform R-SF is the time reversed spreading function code output from PISO Register 68, the waveforms RWAL (0,T) through RWAL (7,T) are the time reversed Walsh functions available at the inverting output of Counter 74 and the waveform TMWF is the time-multiplexed Walsh function output from Data Selector 76.

To synchronize the Walsh function waveforms with the output of the spreading function code stored in PISO Shift Register 68, the positive going leading edge of the third least significant bit (LSB) of Counter 70 is applied to a single Shot Multivibratoe 78 to generate a clock trigger signal at the chipping rate of the transmitted signal. The output of Multivibrator 78 is applied to the clock input of PISO Register 68 through AND Gate 80. AND Gate 80 is enabled by the output of Flip Flop 82 which is set by the output of AND Gate 84 and reset by the spread function validity internal (SFVI) trigger signal which also activates Monostable Multivibrator 66. AND Gate 84 is enabled by the output of Monostable Multivibrator 66 and passes the signal generated by a Single Shot Multivibrator 86 to the set input of Flip Flop 82. The Single Shot Multivibrator 86 is triggered by the positive going leading edge of the inverted most significant bit of counter 74.

In operation, the spreading function validity internal (SFVI) trigger signal activates the Spreading Function Generator 60 to load the spreading function Generator 60 to load the spreading function code into the SIPO Register 62, resets Flip Flop 82 and activates Monostable Multivibrator 66 to generate an inhibit signal. After the spreading function code is loaded into the SIPO Register 62, the Monostable Multivibrator 66 recovers enabling AND Gate 84 and activating Single Shot Multivibrator 64 to generate a load signal which activates PISO Registers 68 and 88 to be loaded with the content of SIPO Registers 62. Upon the occurrence of the positive going leading edge of the inverted most significant bit of Counter 74 Single Shot Multivibrator 86 is activated to generate a signal setting Flip Flop 82 and enabling AND Gate 80. With AND Gate 80 enabled, PISO Registers are activated to shift out one bit for every eighth clock signal of Clock 72.

The spreading function code stored in SIPO Register 68 is shifted out one bit at a time in a reversed order at the chip rate coincident with the effectively time reversed time multiplexed Walsh functions from the Data Selector 76. The shifted out spreading function code bit and the time multiplex Walsh function segments are applied to separate inputs of an Exclusive OR Gate 90 where they are effectively multiplied together to form the desired time-multiplexed reference signal. The output from Exclusive OR Gate 90 is input to a Unipolar to Bipolar Converter 92 which converts the 1s and 0s of the unipolar output of Exclusive OR Gate 90 to a bipolar signal. The output of Unipolar to Bipolar Converter 92 is transmitted to a Balanced Modulator 96 through Gate 94 enabled by the inverted most significant bit (MSB) of Counter 74. The bipolar output of Unipolar to Bipolar Converter 92 modulates, in the Balanced Modulator 96, the frequency signal generated by an Oscillator 98. The frequency signal generated by Oscillator 98 has the same frequency as the intermediate frequency signal input to the other end of Convolver 10 from the Receiver Input 22. The modulated frequency signal generated in Balanced Modulator 96 is applied to Interdigital Tranducer 8 of the Convolver 10.

The convolution of the time-multiplexed reference signals with the signal received from Receiver Input 22 produces time-multiplexed output samples at output terminal 6 of Convolver 10 which are transmitted to the Demultiplexer 26.

Figure 10:
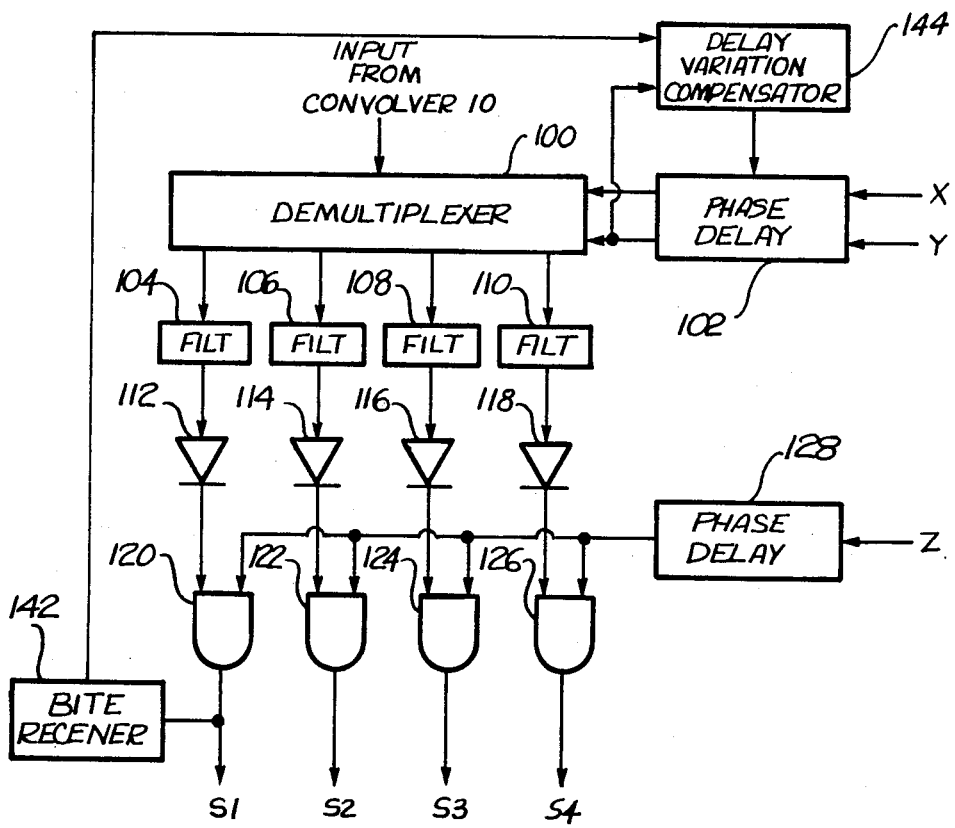
FIG. 10 is a circuit diagram of the Demultiplexer Means.

The details of the Demultiplexer 26 are shown on FIG. 10. Referring to FIG. 10, the time multiplex output samples from time-multiplexed Convolver 10 are received by Demultiplexer Circuit 100 and are separated into four separate channels. Since the output of the Convolver 10 occurs in one half the time, the Demultiplexer Circuit 100 is synchronized with the Data Selector 76, FIG. 9, in the Reference Generator 24 by using the second least significant bit indicated as "X" output, and the least significant bit, indicated as "Y" output, of Counter 70. To compensate for the propagation time of the surface acoustic waves in the time-multiplexed Convolver 10, the second least significant bit "X" and least significant bit "Y" are phase delayed in a Phase Delay Circuit 102. This phase delay optimizes the switching of the received time-multiplexed output sample between the various channels.

The separated output samples in the four separate channels are individually applied to associated Filters 104 through 110 respectively. The band widths of the Filters 104 through 110 are approximately equal to twice the reciprocal chip width to make the sample signal a continuous function of time. The separated output samples are then individually amplitude detected in demodulators 112 through 118. The four demodulated samples S1 through S4 are then applied through Gates 120 through 126 to the Comparator 28 wherein the data is recovered by comparing the relative amplitudes of the four channels.

Since the output of Convolver 10 is a function of two signals propagating at the same velocity in opposite directions, it has the effect of speeding up time so that the convolved output sample waveform occurs in one half of the time and there are spurious signals in the second half. To eliminate these spurious signals, the Gates "Z" is applied to the input of a phase Delay Circuit 128, through 126 are controlled by the second order Walsh function WF-1,T obtained from the second most significant bit of Counter 74 and inverted by Inverter 130 as shown on FIG. 9. The output of Inverter 130, labeled output "Z", is applied to the input of a phase Delay Circuit 128, which delays the second order Walsh function to compensate for the transit time of the acoustic wave signal in convolver 10.

To accurately compensate for variations in the delay through Convolver 10 for the reference signals versus the environment, a test signal is used to automatically set the proper phase of the control signals for Demultiplier Circuit 100. This is accomplished by Parallel-In-Serial-Out (PISO) Shift Register 88 shown on FIG. 9. PISO Register 88 is loaded with the spreading function code stored in SIPO Register 62 in response to the signal generated by Single Shot Multivibrator 64. In contrast to PISO Register 68 in which the spreading function code is shifted out in reverse order, the spreading function code stored in SIPO Register 88 is shifted out by the signal from AND Gate 80 in the same order in which it was generated.

The spreading function 0 and 1 bits as they are shifted out of PISO Register 88 are converted to a bipolar format in Unipolar to Bipolar Converter 132. The bipolar spreading function bits are then applied, through Gate 134, to a second Balanced Modular where they modulate the intermediate frequency signal generated by Oscillator 98. The Gate 134 is enabled from the output of AND Gate 138 in response to the simultaneous occurrence of a built-in-test equipment (BITE) signal and the inverted state of the most significant bit of Counter 74 received from Inverter 140. The BITE signal may be generated periodically using specially designed build-in-test equipment or manually generated to periodically correct the phase delay of Phase Delay Circuit 102 of the Demultiplexer 26.

The modulated intermediate frequency signal generated by the Balanced Modulator 136 is applied to the input (interdigital transducer 2) of the Convolver 10 through Coupler 58 as a test signal. The convolution of this test signal with the reference signals are then applied to the Demultiplexer 26. The signal output from AND Gate 120 indicative of the first order Walsh function output by the Demultiplexer 26 is applied to the input of the built in test BITE Receiver 142. The output of the (BITE) Receiver 142 is applied to the input of a Delay Variation Compensator 144 along with the delayed least significant bit of Counter 70 output from Phase Delay Circuit 102. The Delay Variation Compensator 144 compares the phase of the signal received from BITE Receiver 142 with the phase of the delayed least significant bit of Counter 70 and generates a phase compensation signal applied to the Phase Delay Circuit 102. The Phase Delay Circuit 102 in response to the compensation signal varies the delay of the second least and least significant bits (x and y) applied to the Demultiplexer Circuit 100 automatically maximizing the amplitude of the samples S-1 through S-4 of the separated Walsh functions channels. The BITE Receiver 142 and Delay Variation Compensator 144 constitute a feedback loop during the generation of the built-in-test signal for optimizing the sensitivity of the Demultiplier 26 to the samples output from Convolver 10.

It is not intended that the invention be limited to the embodiment illustrated in the drawings and discussed in the specification. A person skilled in the art will recognize that the invention is not limited to 4-ary OK modulation or that other circuit arrangements may be used to provide the desired functions as described herein and set forth in the following claims.

The invention claimed is:

1. A time-multiplexed convolver for convolving an input signal having a predetermined chip rate with a time reversed-time multiplexed reference signal comprising:
    a piezoelectric substrate;
    a first interdigital transducer for launching a first surface acoustic wave in said piezoelectric substrate along a first path in response to the input signal;
    a second interdigital transducer displaced from said first interdigital transducer for launching a second surface acoustic wave along said first path towards said first interdigital transducer in response to the time reversed-time multiplexed reference signal, said first path between said first and second interdigital transducers defining an interaction region for said first and second surface acoustic waves; and
    a first segmented summing bus disposed on said piezoelectric substrate between said first and second interdigital transducers for generating time-multiplexed samples from the convolution of said first and second surface acoustic waves, said first segmented summing bus having a connector bus outside said interaction region and a plurality of equally spaced fingers extending from said connector bus into said interaction region.

2. The convolver of claim 1 including a first ground bus disposed on said piezoelectric substrate between said first and second interdigital transducers having a common bus outside said interaction region and a plurality of filler segments extending from said common bus into said interaction region between said fingers.

3. The convolver of claim 2 wherein said convolver has an acoustic horn disposed on said piezoelectric substrate between each of said first and second interdigital transducers and said segmented summing bus to compress and focus said first and second surface acoustic waves in said interaction region.

4. The convolver of claim 3 wherein said first and second interdigital transducers produce surface acoustic waves having a predetermined chip width, in response to said input signal, said fingers are equally spaced along said connector bus at a distance equal to said chip width and wherein the width of said fingers is equal to $\frac{1}{2}M$ where M is the number of time-multiplexed reference signals.

5. The convolver of claim 4 having a second convolver disposed on said piezoelectric substrate, said second convolver comprising:
    a third interdigital transducer electrically connected to said first interdigital transducer for launching a third surface acoustic wave along a second path parallel to said first path in response to the input signal;
    a fourth interdigital transducer displaced from said third interdigital transducer along said second path and electrically connected to said second interdigital transducer, said fourth interdigital transducer launching a fourth surface acoustic wave along said second path towards said third interdigital transducer in response to said time reversed-time multiplexed reference signal; and
    wherein one of said third and fourth surface acoustic waves is 180° out of phase with one of said first and second surface acoustic waves.

6. The convolver of claim 5 wherein said third and fourth interdigital transducers are spaced apart along said second path the same distance as said first and second digital transducers are spaced apart along said first path, said second convolver has an intermediate electrode disposed between said third and fourth digital transducers to cause the transit times of said third and fourth surface acoustic waves to be equal to the transit times of said first and second surface acoustic waves between the respective interdigital transducers.

7. The convolver of claim 6 wherein said third interdigital transducer launches said third surface acoustic wave 180° out of phase with said first surface acoustic wave in response to said input signal.

8. The convolver of claim 6 wherein said fourth interdigital transducer launches said fourth surface acoustic wave 180° out of phase with said second surface acoustic wave in response to said time reversed-time multiplexed reference signal.

9. The convolver of claim 6 wherein said intermediate electrode comprises:
  a second segmented summing bus identical to said first summing bus; and
  a second ground bus corresponding to said first ground bus.

10. The convolver of claim 6 wherein said second convolver has a pair of acoustic horns, one acoustic horn disposed intermediate said intermediate electrode and each of said third and fourth interdigital transducers.

11. The convolver of claim 2 having a second convolver disposed on said piezoelectric substrate, said second convolver comprising:
  a third interdigital transducer electrically connected to said first interdigital transducer for launching a third surface acoustic wave along a second path parallel to said first path in response to the input signal;
  a fourth interdigital transducer displaced from said third interdigital transducer and electrically connected to said second interdigital transducer, said fourth interdigital transducer launching a fourth surface acoustic wave along said second path towards said third interdigital transducer in response to said time reversed-time multiplexed reference signal; and
  wherein one of said third or fourth surface acoustic waves is out of phase with said first or second surface acoustic waves respectively to reduce the generatin of spurious signals.

12. The convolver of claim 11 wherein said third and fourth interdigital transducers are spaced apart along said second path the same distance as said first and second interdigital transducers are spaced apart along said first path, said second convolver has an intermediate electrode disposed between said third and fourth interdigital transducers to cause the transit time of said third and fourth surface acoustic waves to be equal to the transit times of said first and third surface acoustic waves between the respective interdigital transducers.

13. The convolver of claim 12 wherein said intermediate electrode comprises:
  a second segmented summing bus corresponding to said first segmented summing bus; and
  a second ground bus corresponding to said first ground bus.

14. The convolver of claim 12 wherein said second convolver has a pair of acoustic horns, one acoustic horn disposed intermediate said intermediate electrode and each of said third and fourth interdigital transducers.

15. The convolver of claim 11 wherein said third interdigital transducer launches said third surface acoustic wave 180° out of phase with said first surface acoustic wave in response to said input signal.

16. The convolver of claim 11 wherein said fourth interdigital transducer launches said fourth surface acoustic wave 180° out of phase with said second surface acoustic wave in response to said time reversed-time multiplexed reference signal.

17. The convolver of claim 1 wherein said convolver has an acoustic horn disposed on said piezoelectric substrate between each of said first and second interdigital transducers and said segmented summing bus to compress and focus said first and second surface acoustic waves in said interaction region.

18. A convolver for convolving an input signal with a time reversed-time multiplexed reference signal comprising:
  a piezoelectric substrate;
  a first interdigital transducer for launching a first surface acoustic wave along a first path on the surface of said substrate in response to said input signal;
  a second interdigital transducer for launching a second surface acoustic wave along said first path on the surface of said substrate in response to said time reversed-time multiplexed reference signal, said first path defining an interaction region of said first and second surface acoustic waves;
  a segmented summing bus disposed intermediate said first and second interdigital transducers, said segmented summing bus having a plurality of equally spaced fingers extending into said interaction region;
  a ground bus having a plurality of filler segments extending into said interaction region between said equally spaced fingers; and
  a pair of acoustic horns, one disposed intermediate said segmented summing bus and each of said first and second interdigital transducers.

19. The convolver of claim 18 further including:
  a third interdigital transducer electrically connected to said first interdigital transducer for launching a third surface acoustic wave along a second path on said substrate parallel to said first path in response to said input signal;
  a fourth interdigital transducer electrically connected to said second interdigital transducer for launching a fourth surface acoustic wave along said second path towards said third interdigital transducer in response to said time reversed-time multiplexed reference signal;
  an intermediate electrode disposed between said third and fourth interdigital transducers;
  a second pair of acoustic horns, one of said second pair of acoustic horns disposed between said intermediate electrode and said each of said third and forth interdigital transducers; and
  wherein one of said third and fourth interdigital transducers launches a surface acoustic wave in response to said input or time reversed-time multiplexed reference signal 180° out of phase with the signal launched by the corresponding first and second interdigital transducers.

20. The convolver of claim 19 wherein said intermediate electrode comprises:
  a second segmented summing bus identical to said first segmented summing bus; and
  a second ground bus identical to said first ground bus.

21. A spread spectrum receiver for demodulating a M-ary orthogonal keying data modulated signal having a predetermined chipping rate comprising an input amplifier for converting the received M-ary orthogonal keying data modulated signal to an input signal, convolver means for convolving said input signal with time reversed reference signals to generate discrete samples, and means for extracting the data from said samples characterized by:
  reference signal generator means for generating time reversed-time multiplexed reference signals;
  a time-multiplexed convolver for convolving said input signal and said time reversed-time multiplexed reference signals to generate M time multiplexed samples where M is equal to the number of orthogonal keying functions of said received M-ary orthogonal keying data modulated signal;

demultiplexer means for separating said time multiplexed samples into M discrete samples; and means for comparing said M discrete samples to extract said data.

22. The receiver of claim 21 wherein said time-multiplexed convolver comprises at least:

a piezoelectric substrate;

a first interdigital transducer for launching a first surface acoustic wave in said piezoelectric substrate in response to said input signal;

a second interdigital transducer, displaced from said first interdigital transducer for launching second surface acoustic waves towards said first interdigital transducer in response to said time reversed-time multiplexed reference signals;

a segmented summing bus disposed between said first and second interdigital transducers for generating said time-multiplexed samples in response to the interaction of said first and second surface acoustic waves, said segmented summing bus having a connector bus outside of the interaction region of said first and second surface acoustic waves and a plurality of equally spaced fingers extending into the interaction region of said first and second surface acoustic waves; and a ground bus disposed between said first and second interdigital transducers having a common bus outside the interaction region of said first and second surface acoustic waves and a plurality of filler segments disposed in the interaction region of said first and second surface acoustic waves between said fingers.

23. The receiver of claim 22 wherein said time multiplexed convolver further has an acoustic horn disposed adjacent to each of said first and second interdigital transducers to compress and focus said first and second surface acoustic waves in said interaction region.

24. The receiver of claim 22 wherein said first and second interdigital transducers produce surface acoustic waves having a predetermined chip width in response to said input and time reversed-time multiplexed reference signals, said fingers are equally spaced along said connector bus at a distance equal to said chip width and have a finger width equal to ½M chip widths.

25. The receiver of claim 24 wherein said M-ary orthogonal keying data modulated signal comprises a pseudo random noise spreading function modulated by M discrete binary phase functions, said reference signal generator means comprises:

clock means for generating clock signals at a rate 2M times the chipping rate of said received signal;

counter means for counting said clock signals to generate time reversed binary phase functions;

data selector means for respectively selecting segments of said time reversed binary phase functions in a sequential order to generate time reversed-time multiplexed binary phase functions at said chip rate means for generating said pseudo random noise spreading function time reversed; and means for multiplexing said reversed pseudo random noise spreading function with said time reversed-time multiplexed reference signals.

26. The receiver of claim 25 wherein said demultiplexer means comprises:

a demultiplexer circuit for separating said time multiplexed samples generated by said time-multiplexed convolver into M separate sample segments in response to predetermined least significant bits of said counter means, each sample segment indicative of the convolution of said input signal with a corresponding segment of one of said binary phase functions; and a plurality of demodulators, one associated with each of said sample segments, for amplitude detection of the associated sample segment to generate said discrete samples.

27. The receiver of claim 26 wherein said demultiplexer means includes a phase delay circuit for phase delaying said predetermined least significant bits generated by said counter means to compensate for the transit time of the surface acoustic waves in said time-multiplexed convolver.

28. The receiver of claim 27 wherein said reference signal generator has means for generating a test input signal to said time multiplexed convolver and wherein said demultiplexer means has means for correcting the phase delay of said predetermined least significant bits of said counter means to optimize the separation of the time samples by said demultiplexer circuit in response to said test input signal.

29. The receiver of claim 26 wherein said binary phase functions are M Walsh functions.

30. A spread spectrum communication system comprising:

transmitter means for transmitting a pseudo random noise, phase modulated signal having a predetermined chip rate and modulated with data desired to be sent;

receiver input means for generating a convolver input signal at a predetermined intermediate frequency in response to receiving said pseudo random noise, phase modulated signal;

reference signal generator means for generating time reversed-time multiplexed reference signals having said same pseudo random noise phase modulated signal in a time reversed sequence;

time-multiplexed convolver means for convolving said convolver input signal with said time reversed-time multiplexed reference signal to generate time multiplexed output samples;

demultiplexer means for separating said time multiplexed output samples to generate discrete samples, each discrete sample corresponding to one of said binary phase modulations; and means for comparing the amplitudes of said discrete samples to recover said data.

31. The communication system of claim 30 wherein said time multiplexed convolver includes a surface acoustic wave convolver comprising at least:

a piezoelectric substrate;

a first interdigital transducer disposed on said substrate for generating a first surface acoustic wave in response to said convolver input signal;

a first acoustic horn provided on the surface of said substrate adjacent to said first interdigital transducer for compressing and focusing said first surface acoustic wave;

a second interdigital transducer disposed on said substrate for generating a second surface acoustic wave towards said first interdigital transducer in response to said time multiplexed reference signal;

a second acoustic horn provided on the surface of the substrate adjacent to said second interdigital transducer for compressing and focusing said second surface acoustic wave, the region between said first and second acoustic horns defining an interaction region;

a segmented summing bus disposed between said first and second acoustic horns for generating said time multiplexed output samples, said summing bus having a connector bus provided parallel to and outside of said interaction region and a plurality of equally spaced fingers connected to said connector bus and extending into said interaction region; and a ground bus provided on the surface of said substrate, said ground bus having a common bus parallel to and outside said interaction region and a plurality of filler segments connected to said common bus and disposed in said interaction region between said fingers.

32. The communication system of claim 31 wherein said first interdigital transducer generates a surface acoustic wave having a predetermined chip width, said fingers are equally spaced along said connector bus at a distance equal to said predetermined chip width and wherein said fingers have a finger width equal to ½M of said chip width where M is the number of said reference signals in each of said time reversed-time multiplexed reference signals.

33. The communication system of claim 31 wherein said transmitter means transmits a carrier frequency modulated by said pseudo-random noise binary phase modulated signal, said receiver input means includes means for mixing said carrier frequency with a local oscillator frequency to generate said input signal having an intermediate frequency modulated by said pseudo-random noise phase modulated signal and wherein said reference signal generator means generates said time reversed-time multiplexed reference signal having said same intermediate frequency modulated by said time reversed-time multiplexed pseudo-random noise phase modulated signal.

34. The communication system of claim 33 wherein said reference signal generator means comprises:
    means for generating a time reversed-time multiplexed signal having the same format as said pseudo random noise phase modulated signal;
    means for generating said intermediate frequency signal; and
    means for modulating said intermediate frequency signal with said time reversed-time multiplexed signal to generate said time reversed-time multiplexed reference signal.

35. The communication system of claim 34 wherein said pseudo-random noise is a spreading function code having a predetermined number of chips and said binary phase modulations are Walsh functions.

36. The communication system of claim 35 wherein said means for generating said time reversed-time multiplexed reference signals comprises:
    means for generating clock signals at a rate 2M times faster than said predetermined chip rate, where M is the number of Walsh functions used in said transmitted pseudo-random noise, phase modulated signal;
    counter means counting said clock signals to generate time reversed Walsh functions having the same form as said Walsh functions;
    data selector means for repetitively selecting segments of said time reversed Walsh functions in a sequential order to generate time reversed-time multiplexed Walsh function signals at said chip rate;
    means for generating said spreading function code at said chip rate in a time-reversed order; and
    means for multiplying said time reversed spreading function code with said time reversed multiplexed Walsh function signals to generate said time reversed-time multiplexed signal.

37. The communication system of claim 36 wherein said demultiplexer means comprises:
    a demultiplexer circuit for separating said time multiplexed samples generated by said time-multiplexed convolver into M sample segments in response to predetermined least significant bits of said counter means, each sample segment indicative of the convolution of said input signal with a corresponding segment of one of said Walsh functions;
    a plurality of demodulators, one associated with each of said sample segments for amplitude detection of the associated sample segment, to generate said discrete samples, and
    phase delay means for delaying the phase of said predetermined least significant bits received by said demultiplexer circuit to compensate for the transit time of said surface acoustic waves in said time-multiplexed convolver.

38. The communication system of claim 37 wherein said reference signal generator has means for generating a test input signal to said convolver and said demultiplexer means has means for correcting the phase delay of said predetermined least significant bits of said counter means by said phase delay means to optimize the separation of said time multiplexed samples by said demultiplexer circuit in response to said test input signal.

* * * * *